(12) United States Patent
Hao et al.

(10) Patent No.: US 8,963,969 B2
(45) Date of Patent: Feb. 24, 2015

(54) PROVIDING AN AUTOMATED VISUALIZATION OF A COLLECTION OF DATA VALUES DIVIDED INTO A NUMBER OF BINS DEPENDING UPON A CHANGE FEATURE OF THE DATA VALUES

(75) Inventors: Ming C. Hao, Palo Alto, CA (US); Tobias Schreck, Constance (DE); Umeshwar Dayal, Saratoga, CA (US); Daniel A. Keim, Steisslingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 2511 days.

(21) Appl. No.: 11/700,429

(22) Filed: Jan. 31, 2007

(65) Prior Publication Data
US 2008/0180382 A1    Jul. 31, 2008

(51) Int. Cl.
- *G09G 5/02* (2006.01)
- *G09G 5/391* (2006.01)
- *G09G 5/40* (2006.01)
- *G09G 5/42* (2006.01)
- *G06Q 30/02* (2012.01)
- *G06Q 40/02* (2012.01)

(52) U.S. Cl.
CPC ................ *G06Q 40/02* (2013.01); *G06Q 30/02* (2013.01)
USPC .......................................... 345/698; 345/699

(58) Field of Classification Search
USPC ................................................. 345/698–699
See application file for complete search history.

(56) References Cited

U.S. PATENT DOCUMENTS

| 3,487,308 | A |   | 12/1969 | Johnson |
| 5,581,797 | A |   | 12/1996 | Baker et al. |
| 5,588,117 | A |   | 12/1996 | Karp et al. |
| 5,608,904 | A |   | 3/1997 | Chaudhuri et al. |
| 5,623,590 | A |   | 4/1997 | Becker et al. |
| 5,623,598 | A |   | 4/1997 | Voigt et al. |
| 5,632,009 | A | * | 5/1997 | Rao et al. ...................... 715/201 |
| 5,634,133 | A |   | 5/1997 | Kelley |
| 5,659,768 | A |   | 8/1997 | Forbes et al. |
| 5,694,591 | A |   | 12/1997 | Du et al. |
| 5,742,778 | A |   | 4/1998 | Hao et al. |
| 5,757,356 | A |   | 5/1998 | Takasaki et al. |
| 5,801,688 | A |   | 9/1998 | Mead et al. |
| 5,828,866 | A |   | 10/1998 | Hao et al. |
| 5,844,553 | A |   | 12/1998 | Hao et al. |
| 5,878,206 | A |   | 3/1999 | Chen et al. |
| 5,903,891 | A |   | 5/1999 | Chen et al. |

(Continued)

FOREIGN PATENT DOCUMENTS

EP         0778001         11/1996

OTHER PUBLICATIONS

United States Patent Office, U.S. Appl. No. 11/523,240, Office Action dated Mar. 11, 2010, pp. 1-37 and attachment.

(Continued)

*Primary Examiner* — William Boddie
*Assistant Examiner* — Andrew Schnirel

(57) ABSTRACT

A collection of data values is divided into plural bins, wherein a number of the bins is dependent upon a change feature of the data values. Parameter values associated with respective bins are determined. Based on the parameter values, visualization of the plural bins is provided in corresponding plural display screen partitions of a display screen, wherein at least one of the display screen partitions has a resolution that is different from another of the display screen partitions.

20 Claims, 4 Drawing Sheets
(1 of 4 Drawing Sheet(s) Filed in Color)

(56) References Cited

U.S. PATENT DOCUMENTS

| | | | |
|---|---|---|---|
| 5,924,103 | A | 7/1999 | Ahmed et al. |
| 5,929,863 | A | 7/1999 | Tabei et al. |
| 5,940,839 | A | 8/1999 | Chen et al. |
| 5,986,673 | A | 11/1999 | Martz |
| 5,999,193 | A | 12/1999 | Conley, Jr. et al. |
| 6,052,890 | A | 4/2000 | Malagrino, Jr. et al. |
| 6,097,399 | A | 8/2000 | Bhatt |
| 6,115,027 | A | 9/2000 | Hao et al. |
| 6,144,379 | A | 11/2000 | Bertram et al. |
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,314,453 | B1 | 11/2001 | Hao et al. |
| 6,377,287 | B1 | 4/2002 | Hao et al. |
| 6,400,366 | B1 | 6/2002 | Davies et al. |
| 6,429,868 | B1 | 8/2002 | Dehner, Jr. et al. |
| 6,466,946 | B1 | 10/2002 | Mishra et al. |
| 6,502,091 | B1 | 12/2002 | Chundi et al. |
| 6,584,433 | B1 | 6/2003 | Zhang et al. |
| 6,590,577 | B1 | 7/2003 | Yonts |
| 6,603,477 | B1 | 8/2003 | Tittle |
| 6,646,652 | B2 * | 11/2003 | Card et al. ............... 345/645 |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 6,934,578 | B2 | 8/2005 | Ramseth |
| 7,020,869 | B2 | 3/2006 | Abrari et al. |
| 7,202,868 | B2 | 4/2007 | Hao |
| 7,218,325 | B1 | 5/2007 | Buck |
| 7,221,474 | B2 | 5/2007 | Hao et al. |
| 7,313,533 | B2 | 12/2007 | Chang et al. |
| 7,567,250 | B2 | 7/2009 | Hao et al. |
| 7,714,876 | B1 | 5/2010 | Hao |
| 2002/0118193 | A1 | 8/2002 | Halstead, Jr. |
| 2002/0171646 | A1 | 11/2002 | Kandogan |
| 2003/0065546 | A1 | 4/2003 | Goruer et al. |
| 2003/0071815 | A1 | 4/2003 | Hao et al. |
| 2003/0122874 | A1 * | 7/2003 | Dieberger et al. ........ 345/764 |
| 2003/0221005 | A1 | 11/2003 | Betge-Brezetz et al. |
| 2004/0051721 | A1 | 3/2004 | Ramseth |
| 2004/0054294 | A1 | 3/2004 | Ramseth |
| 2004/0054295 | A1 | 3/2004 | Ramseth |
| 2004/0168115 | A1 | 8/2004 | Bauernschmidt et al. |
| 2004/0210540 | A1 | 10/2004 | Israel et al. |
| 2005/0066026 | A1 | 3/2005 | Chen et al. |
| 2005/0088441 | A1 * | 4/2005 | Hao et al. ............... 345/440 |
| 2005/0119932 | A1 | 6/2005 | Hao |
| 2005/0219262 | A1 | 10/2005 | Hao et al. |
| 2006/0095858 | A1 | 5/2006 | Hao et al. |
| 2006/0241927 | A1 * | 10/2006 | Kadambe et al. ............. 703/20 |
| 2007/0225986 | A1 | 9/2007 | Bowe, Jr. et al. |
| 2009/0033664 | A1 | 2/2009 | Hao et al. |

OTHER PUBLICATIONS

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

D. Keim et al "Hierarchical Pixel Bar Charts", IEEE Transactions on Visualization and Computer Graphics, vol. 8, No. 3, Jul.-Sep. 2002, pp. 255-269.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

U.S. Appl. No. 11/523,240 entitled "Time Relevance-Based Visualization of Data" filed on Sep. 19, 2006, pp. 1-22.

* cited by examiner

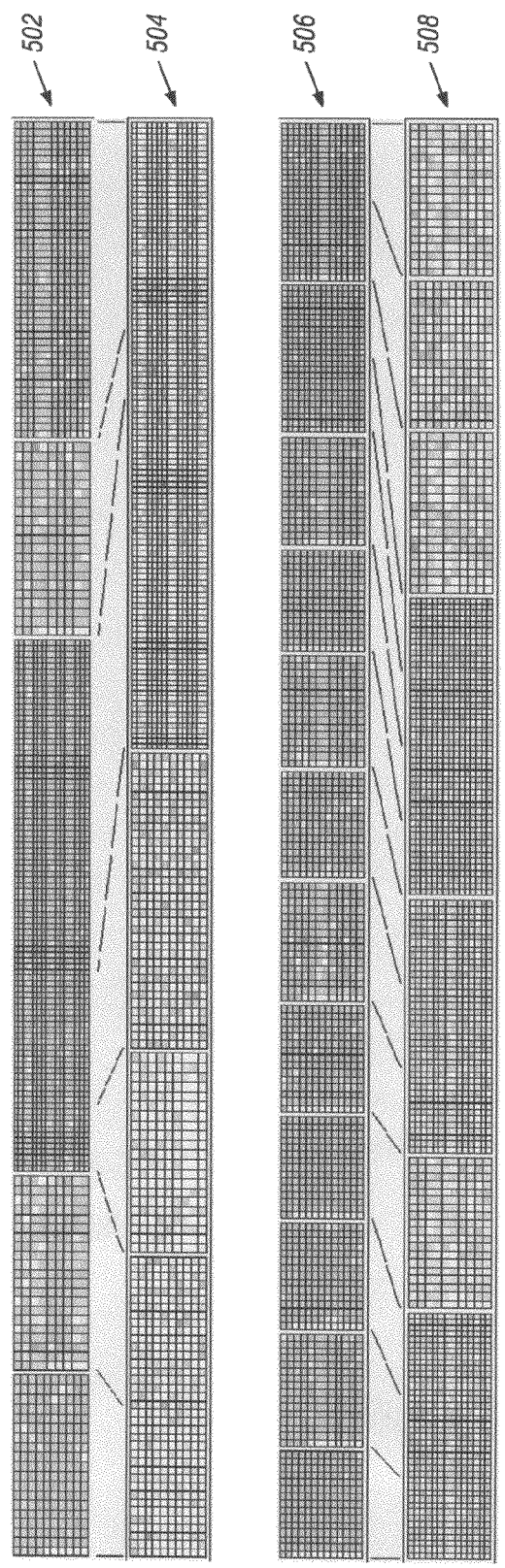

PROVIDING AN AUTOMATED VISUALIZATION OF A COLLECTION OF DATA VALUES DIVIDED INTO A NUMBER OF BINS DEPENDING UPON A CHANGE FEATURE OF THE DATA VALUES

BACKGROUND

In many applications, data can be provided in a time series (or data streams), in which data values are provided in a series of time points. Example applications in which data can be expressed in time series include financial applications (e.g., time series of asset prices, revenue, profit, currency exchange rates, etc.), and network monitoring (e.g., metrics regarding performance of various aspects of a network, performance metrics of servers, performance metrics of routers, etc.), and so forth.

The amount of data in a time series for a given application can be very large. As a result, it is often difficult for a user to effectively visualize the time series of data. Conventionally, techniques for managing a large time series of data include sampling or aggregation to reduce data size, or using a scrolling technique to fit a large amount of data in a display device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described with respect to the following figures:

FIG. 5 illustrates multi-resolution displays of four different time series, generated according to an embodiment.

DETAILED DESCRIPTION

Figure 1A:
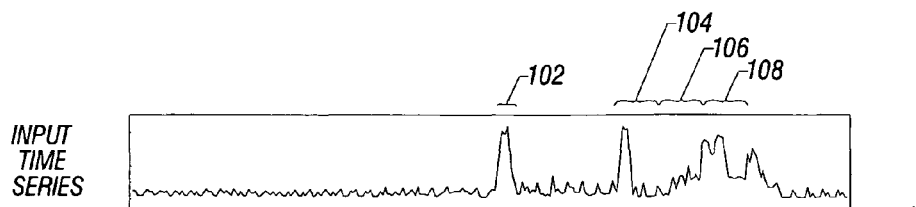
FIGS. 1A-1C are graphs illustrating generation of degree of interestingness profiles based on a time series of data, in accordance with an embodiment.

In accordance with some embodiments, a data-driven visualization technique for a time series of data (data values at a series of time points, whether discrete time points or continuous time points), or other collection of data values, provides for display of the time series (or other collection) of data, using multiple resolution layouts for different parts (referred to as "bins") of the time series (or other collection) of data. For example, a first bin of the time series of data can be displayed with a first display resolution in a first partition of a display screen, a second bin of the time series of data can be displayed with a second display resolution in a second partition of the display screen, and so forth. In accordance with some embodiments, the number of bins into which the time series is divided into is based on a change feature (such as change rate or variance) of the data values of the time series. For example, if a time series of data values is relatively stable and the change rate of data values is relatively small, then the time series would be divided into a smaller number of bins. However, if the time series of data values changes frequently (relatively high change rate), then the time series would be divided into a larger number of bins. A "change feature" of data values in a time series (or other collection) of data values can also refer to an amount of variation (variance) of the data values, such as variance of currency exchange rates, variance of sales prices, or variance of network performance measures. Effectively, the number of different partitions of differing resolutions used to visualize the time series of data is driven by the data values in the time series. Also, in some embodiments, a multi-resolution visualization of the time series can be provided in real-time (in other words, the multi-resolution visualization is performed as the input time series is being processed). The multiple resolutions for visualizing the time series is not predetermined, but determined by the data values of the time series.

As used herein, the "resolution" of a display screen partition refers to the size of the display screen partition, the number of display cells in the display screen partition, and/or the size of the display cells, used to represent the data values in the corresponding bin of the time series. A display screen partition with a smaller resolution has bigger display cells to represent corresponding data values, where the bigger display cells allow a user to more easily perceive data values within the corresponding display cells.

Examples of data values that can be visualized include data values associated with finance applications (e.g., sales numbers, asset prices, profits, revenues, currency exchange rates, etc.), hardware and/or software monitoring (e.g., network utilization, CPU utilization, network speeds, etc.), and others. Change features can be associated with each of these different types of data values.

A display screen is a graphical image displayed by a display device, where the display screen can fill up an entire display area of the display device or just a portion of the display area of the display device. For example, the display screen can be a window (such as a window provided by an operating system such as a Microsoft operating system, Unix operating system, Linux operating system, etc.) displayed in the display device. The display screen is divided into multiple partitions, where each partition of the display screen can have a different resolution to display corresponding different bins of the time series of data. Thus, the different partitions of the display screen for displaying the time series of data can have different layouts, where the different layouts correspond to different resolutions. Such a display screen is referred to as a "multi-resolution" display screen.

The ability to provide visualization of different bins of a time series of data using different resolution layouts is accomplished without a priori user knowledge of the data. The multi-resolution visualization is automated based on the input time series. The multi-resolution visualization provides for more effective understanding by users. Also, by using the multi-resolution visualization technique according to some embodiments, more efficient usage of the display area of a display device for visualizing large amounts of data can be accomplished.

In accordance with some embodiments, a parameter associated with each respective bin of the time series of data is used to indicate what resolution to use for the bin. In some implementations, this parameter is referred to as a degree of interestingness parameter (abbreviated as a DOI parameter). A DOI parameter indicates how interesting a particular bin of a time series of data is. In some embodiments, a bin of the time series where the data value changes a lot is a bin that is more interesting than another bin of the time series of data where the data values change less. Alternatively, a bin of the time series of data where the maximum, minimum, or other aggregate (e.g., average, sum, etc.) of data values is larger or smaller than another bin is considered more interesting. For example, if the data values of the time series represent network utilization, then bins of the time series where the data values are high would be more interesting since those are the bins which may indicate an overload condition of the network. As another example, if the data values of the time series represent foreign exchange rates, then bins of the time series where the exchange rates are high would be more interesting that where exchange rates are low. By displaying more interesting bins of a time series in a different partition of the display screen, a user's attention can be drawn to the more interesting data values within the time series. The display screen bins for the less interesting parts of the time series have higher resolutions (and thus smaller arrays of display cells) to display data values in those bins. The higher resolution display screen partitions have a larger number of smaller display cells to allow more data values to be displayed in those display screen partitions. Since those display screen partitions correspond to less interesting bins of the time series, the larger number of smaller display cells allows for a larger amount of less interesting data values to be squeezed into the corresponding display screen partition. On the other hand, more interesting data values are displayed in display screen partitions of lower resolution (that have larger display cells), so that the user's attention is drawn to such more interesting data values.

FIG. 1A depicts an example input time series, where data values are plotted against time (t). As depicted in the example of FIG. 1A, there are various segments of the time series where the data values vary by a larger amount (or have larger magnitudes), such as in segments 102, 104, 106, and 108. These segments are deemed more interesting than the remaining segments of the input time series depicted in FIG. 1A, which have less variability in data values (or have data values with smaller magnitude). Note that, as described further below, at least some of the segments of FIG. 1A can be merged to form bins associated with different resolutions. The number of bins after merging (and thus the number of resolutions) depends on change rates (or other change features) of the data values, and is not predefined. The change rate of data values refers to how frequently data values change by greater (or less) than some predefined threshold within a particular time interval. A change feature of data values can also refer to variance of the data values.

According to some embodiments, a DOI (degree of interestingness) parameter values are generated for different segments of the time series. The DOI parameter values together make up a DOI profile. A segment of a time series can also be referred to as a time bin (or more simply "bin"), where a time series is separated into multiple bins. More specifically, according to one embodiment, the time series is partitioned into M (where M is an integer) equal-width bins. Alternatively, instead of equal-width bins, different width bins can be used. For each bin, a value for the DOI parameter is calculated, where the value of the DOI parameter is calculated based on a function (DOI function) that takes as input data values of the time series within the corresponding bin. In one example, the DOI function can be a simple averaging function that is based on an average of the data values within the bin. The DOI function can be another type of aggregation, such as sum, minimum, maximum, and so forth. Alternatively, a more sophisticated DOI function can be used, which more sophisticated DOI function can apply some predefined mathematical algorithm on the data values within the bin.

Figure 1B:
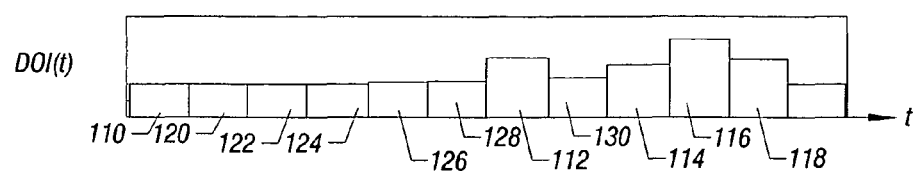

For each bin, the DOI parameter value, represented as DOI(t), assigned is a constant value, such that at each time point t within that bin, the DOI(t) value is constant, as depicted in FIG. 1B. Thus, for example, in FIG. 1B, bin 110 is associated with a DOI(t) value that is constant over all time points t within the bin 110. Bin 112 in FIG. 1B is associated with the segment 102 of the time series in FIG. 1A that has larger variability of data values. As a consequence, in the example depicted in FIG. 1B, the DOI(t) parameter value for bin 112 is higher than the DOI(t) parameter values in the bins with lower variability of data values. Segments 104, 106, and 108 depicted in FIG. 1A correspond to respective bins 114, 116, and 118, which also have relatively elevated values of the DOI(t) parameter.

To further enhance efficiency, adjacent bins whose DOI(t) values are similar to each other in magnitude (as determined by a threshold parameter Th) are merged into a larger bin. Thus, in the example of FIG. 1B, successive bins 110, 120, 122, 124, 126, and 128 are merged into a larger bin 140, depicted in FIG. 1C, where the larger bin 140 covers a time interval equal to the combined time interval of bins 110, 120, 122, 124, 126, and 128. Similarly, as further depicted in FIG. 1C, adjacent bins 130 and 114 in FIG. 1B are merged into a larger bin 142 in FIG. 1C. Effectively, adjacent bins whose DOI(t) values differ by less than the threshold parameter Th (which is a predefined value) are merged. Note that the merging is done in successive fashion, where first two adjacent bins are merged into a larger bin, and then the larger bin is merged with an adjacent bin if the respective DOI(t) values differ by less than Th. The resulting refined DOI profile is a piece-wise constant DOI function, with cardinality N less than or equal to M (in other words, the number of bins N in the refined DOI profile is less than or equal to the number M of original bins). For example, in FIG. 1C, the number of bins is less than the number of bins in FIG. 1B.

When multiple bins are merged, the DOI(t) parameter values of the respective bins are averaged to produce the DOI(t) parameter value for the merged bin.

Figure 1C:
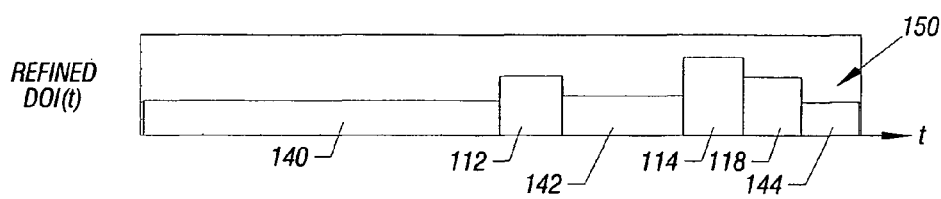
Figure 2:
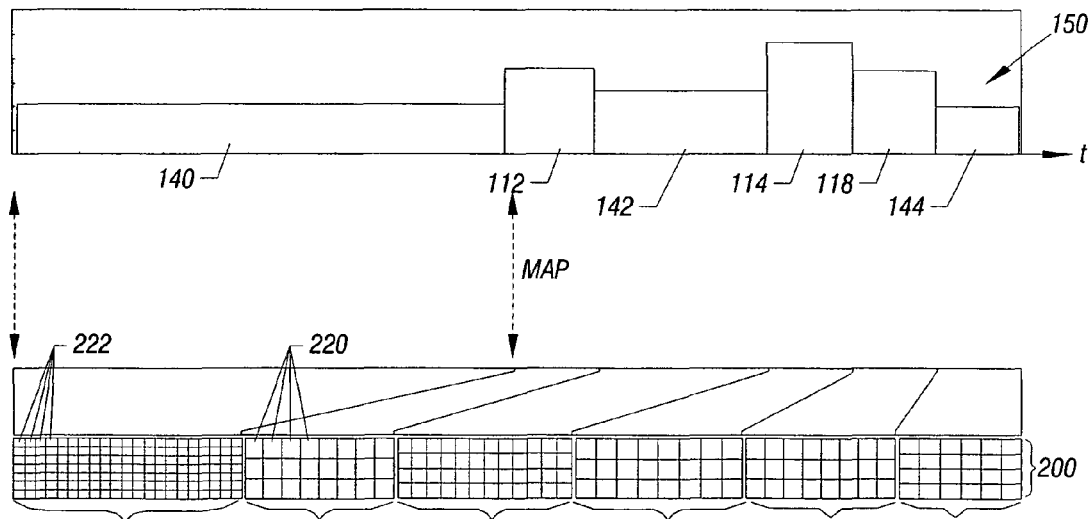
FIG. 2 illustrates mapping of a degree of interestingness profile to a multi-resolution display of the time series of data, in accordance with an embodiment.

The refined DOI profile, as depicted in FIG. 1C according to one example, is mapped to a multi-resolution display, as depicted in FIG. 2. The refined DOI profile breaks up the time series into a number of bins (where some of the bins may be merged bins), each with a constant level of interestingness. As a consequence, the time series data has already been segmented by the refined DOI profile into successive segments of different interestingness levels. The data values within each segment is displayed in the same display screen partition (or visual unit) that has a corresponding resolution level. Thus, as depicted in FIG. 2, the refined DOI profile 150 (which is the same DOI profile of FIG. 1C) defines several bins, represented as bins 140, 112, 142, 114, 118, and 144 (which correspond to respective bins defined in FIG. 1B and/or FIG. 1C).

As noted above, the number of the bins depicted in FIG. 1B (after merging) depends on the change feature of the data values. The bins 140, 112, 142, 114, 118, and 144 defined by the DOI profile 150 are mapped to corresponding display screen partitions 202, 204, 206, 208, 210, and 212. The display screen partitions 202-212 make up a display screen 200, which is displayed by a display device. As indicated in the example of FIG. 2, display screen partitions 204, 208, and 210, which correspond to bins 112, 114, and 118 (associated with higher DOI parameters values) have lower resolutions (larger display cells). Thus, for example, display cells 220 in the display screen partition 204 are larger than display cells 222 in display screen partition 202. However, note that display screen partition 202 has a larger number of display cells 222 than the display cells 220 in display screen partition 204. This allows partition 202 to display a larger number of less interesting data values in smaller display cells, and partition 204 to display a smaller number of more interesting data values in larger display cells.

In accordance with some embodiments, each display screen partition is a color-coded matrix, where each individual cell of the display screen partition has a color corresponding to the data value. In one example embodiment, a data value can be mapped to a color according to the following relationship:

$$\text{colormap::} x \to \{r, g, b\}, x \in [0, 1]$$

where x is a normalized data value (normalized to a value between 0 and 1). For example, the mapping can be according to a scale where low data values are mapped to a color according to a scale from green (corresponding to lower values) through yellow (corresponding to medium values) to red (corresponding to higher data values).

Alternatively, instead of display data values using color coding, actual data values can be displayed in the display cells in a different implementation.

The discussion below provides additional details of a data-driven technique to provide a multi-resolution visualization of a time series of data values. The resolution of a display screen partition can be mapped according to the following relationship:

$$R_i = \left( \frac{\int_{i^0}^{i^n} DOI(t) dt}{\int_{-\infty}^{+\infty} DOI(t) dt} \right)^{1/s}, \quad \text{(Eq. 1)}$$

where $R_i$ corresponds to a bin $D_i$ in the interval $[i^0, i^n]$ of a time series. The interval $[i^0, i^n]$ is equal to the size of the refined bin (a bin defined by the refined DOI profile). The value of s is a non-zero scaling factor. Effectively, Eq. 1 specifies that the resolution $R_i$ for bin $D_i$ is proportional to the area defined by the DOI(t) value in the respective bin $D_i$ divided by the total area represented by the bins of the entire time series (for example, in FIG. 1C, the total area of bins 140, 112, 142, 114, 118, and 144). For a scaling factor s>1, smaller resolution levels are emphasized, while for s<1, smaller resolution levels are deemphasized. For s>1, bigger display cells are emphasized for lower resolution levels (such as in display screen partition 204 in FIG. 2).

The resolution values $R_i$ of the different bins $D_i$ can be mapped to respective display rendering methods (routines) to provide the display screen partition of the desired resolution. Thus, with respect to the example of FIG. 2, display screen partition 202 can be rendered with one display method, display screen partition 204 can be displayed with a second display screen method, and so forth. The display methods display screen partitions using different resolutions.

Figure 3:
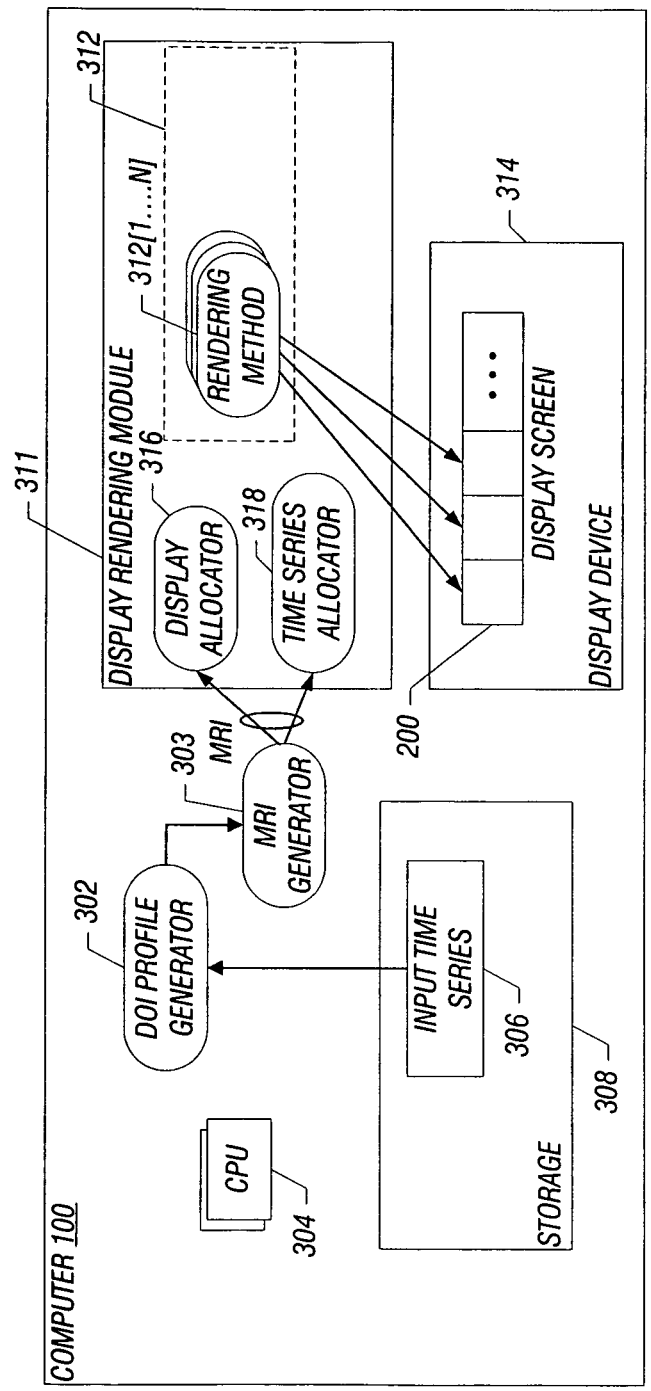
FIG. 3 is a block diagram of an exemplary computer in which an embodiment of the invention can be incorporated.

FIG. 3 is a block diagram of an example computer 100 in which some embodiments of the invention can be implemented. The computer 100 includes a DOI profile generator 302, which can be implemented as software executable on one or more central processing units (CPUs) 304. The DOI profile generator 302 takes as input an input time series 306, which is stored in a storage 308, and partitions the input time series into N equal-width bins according to an embodiment. The DOI profile generator 302 then computes DOI parameter values for each bin, and the DOI profile generator also merges bins that have similar DOI parameter magnitudes.

Based on the refining, the DOI profile generator 102 outputs a refined DOI profile that is provided to an MRI (multi-resolution index) generator 303, which can also be implemented as software executable on the CPU(s) 304. The MRI generator 303 produces a multi-resolution index that is provided to a display rendering module 311 to produce a multi-resolution display screen according to an embodiment. The MRI generator 303 and display rendering module 311 are discussed further below.

The computer 100 also includes a display device 314, which is able to display a display screen 200 having multiple display screen partitions. In the example of FIG. 3, N rendering methods 312[1–N] are depicted as being part of the display rendering module 311, where the rendering method 312[1] is used to render a matrix of display cells in a first display screen partition (at a first resolution level), the second rendering method 312[2] is used to render display cells in another display screen partition (at a second resolution level), and so forth. Note that some of the rendering methods can provide the same resolution.

Figure 4:
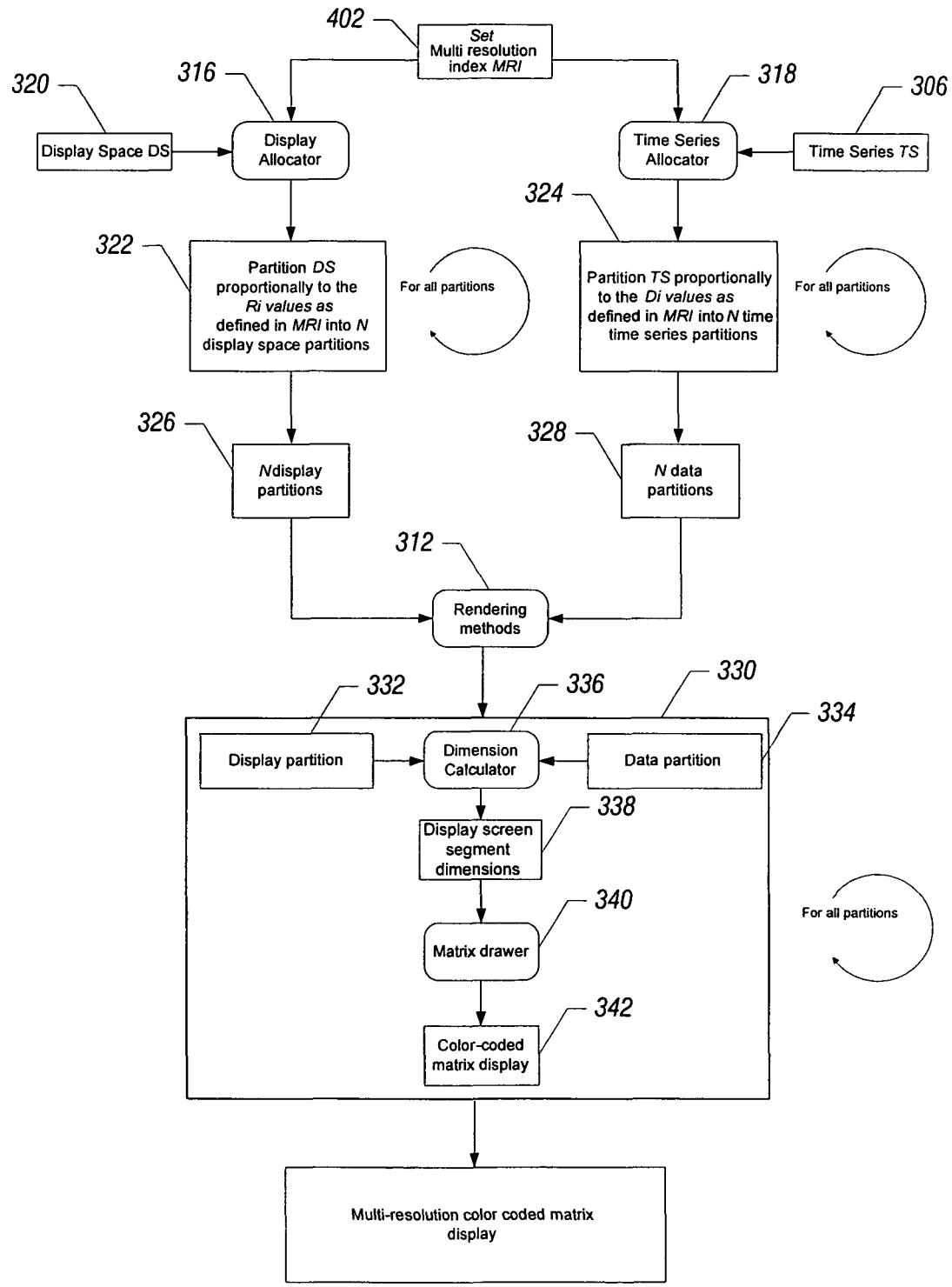
FIG. 4 is a flow diagram of a process of producing a multi-resolution display of a time series of data, according to an embodiment.

FIG. 4 is a flow diagram of a process performed according to an embodiment. Initially, a multi-resolution index (MRI) is set (at 402) by the MRI generator 303 (FIG. 3), where MRI is equal to:

$$MRI = \{MRI_1, MRI_2, \ldots\},$$

Each $MRI_i$ is defined as follows: $MRI_i = (D_i, R_i, V_i)$, where $D_i$ is a range that specifies the time interval (bin) that is addressed by $MRM_i$, $R_i$ is a display space that specifies the fraction of the display screen that is to be allocated to $D_i$, and $V_i$ is the rendering method that performs a drawing technique to be used for visualizing $D_i$ within $R_i$. $R_i$ and $D_i$ are discussed above.

The MRI is provided as input to a display allocator 316 and a time series allocator 318, which are part of the display rendering module 311 (FIG. 3), according to an embodiment. The display allocator 316 also receives as input the display space DS 320 that represents the area of the display screen in which the time series data is to be visualized. Also, the time series allocator 318 receives a time series TS, which corresponds to the input time series 306 of FIG. 3.

The display allocator 316 partitions (at 322) the display space DS proportionally to the fraction values $R_i$, as defined in MRI, into N display space partitions. Also, for all partitions, the time series allocator 318 partitions (at 324) the time series TS proportionally to the $D_i$ values as defined in MRI into N time series partitions.

The result of the partitioning at 322 is N display partitions (326), and result of the partitioning at 324 includes N data partitions (328). The N display partitions 326 and N data partitions 328 are fed to the rendering methods 312 (312A, 312B depicted in FIG. 3) to render the respective matrices of display cells in each display screen partition.

Block 330 in FIG. 4 represents tasks performed by a particular one ($V_i$) of the rendering methods 312. Note that the tasks 330 are performed for each of the display screen partitions. A corresponding display partition 332 and corresponding data partition 334 are fed into a dimension calculator 336, which determines the dimensions of the particular display screen segment. The dimensions of the display screen segment are calculated based on the fraction $R_i$ of the total display space DS to be allocated to this particular partition. Also, the size of the display cells within the display screen segment are calculated based on the data partition 334 that indicates the number of data values that have to be visualized in the display screen segment.

The output of the dimension calculator 336 produces display screen segment dimensions in terms of rows and columns (number of rows and number of columns, and the sizes of each of the rows and columns). The dimensions are fed to a matrix drawer 340 in the rendering method $V_i$, where the matrix drawer 340 is used to produce a color-coded matrix display 342 in the corresponding display screen partition.

The output of the process of FIG. 4 is a multi-resolution, color-coded matrix display, where the display screen is divided into N partitions with at least some of the partitions having different resolutions.

In many scenarios, it may be desirable to generate multi-resolution display layouts for multiple time series. There are two possible modes of operation. In a first mode, a multi-resolution display layout profile that is automatically generated from one specific time series is repeatedly applied to other time series within a given set of multiple time series. This choice is appropriate when there is one root (master) time series in the set, which in some way exercises influence on the other time series in the set, and for which correlation between the other time series and the root time series is desirable.

In a second mode of operation, individual multi-resolution analysis is performed for each of multiple time series, such that different multi-resolution display layouts can be generated for the different time series.

FIG. 5 shows an example of the second mode of operation, in which four time series are depicted, where each time series is subjected to independent processing such that the number of bins (and different layouts) used in the visualization can vary among the different time series. The four time series represent exchange rates for different currencies. The display screens 502, 504, 506, and 508 for the four time series have different numbers of bins. The first two display screens 502, 504 are associated with time series having high variance (high change rates) in the respective data values, which indicates that the currencies represented by the first two time series have high variability in their respective exchange rates. As a result, the number of bins represented by the display screens 502, 504 is greater. On the other hand, the display screens 506, 508 are associated with time series having low variance (low change rates) in the respective data values. As a result, the number of bins in the display screens 506, 508 is lower. The four display screens 502-508 allow a user to more easily visualize which time series are associated with currency exchange rates having higher variability. As discussed above, the different display cells in the display screens are assigned different colors to correspond to different data values. Color-coded display matrices are thus presented.

Instructions of software described above (including DOI profile generator 302, MRI generator 303, display rendering module 311, of FIG. 3) are loaded for execution on a processor (such as one or more CPUs 304 in FIG. 3). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer, comprising:
dividing, by the computer, a collection of data values into plural bins, wherein a number of the plural bins is dependent on a change feature of the data values, wherein the change feature comprises a change rate of the data values, and wherein dividing the collection of data values into the plural bins comprises dividing the collection of data values into a larger number of bins in response to determining a higher change rate of the data values;
determining, by the computer, parameter values associated with respective bins; and
based on the parameter values, providing, by the computer, visualization of the plural bins in corresponding plural display screen partitions of a display screen, wherein at least one of the display screen partitions has a resolution that is different from another of the display screen partitions.

2. The method of claim 1, wherein dividing the collection of data values comprises dividing a time series of data values into the plural bins.

3. The method of claim 1, wherein providing the visualization of the plural bins in corresponding plural display screen partitions comprises displaying a first one of the display screen partitions with a first matrix of display cells having a first size, and displaying a second one of the display screen partitions with a second matrix of display cells having a second size.

4. The method of claim 1, wherein providing the visualization of the plural bins in corresponding plural display screen partitions comprises displaying a first one of the display screen partitions that has a first size, and displaying a second one of the display screen partitions having a second size.

5. The method of claim 1, wherein determining the parameter values associated with respective bins comprises determining the parameter values that indicate levels of interestingness of respective bins.

6. The method of claim 1, further comprising:
partitioning the collection of data values into plural segments;
assigning parameter values to the plural segments; and
forming the plural bins based on the plural segments, wherein at least a particular one of the plural bins merges at least two adjacent ones of the segments.

7. The method of claim 6, wherein determining the parameter values associated with the respective bins is based on the parameter values associated with the respective segments, wherein the parameter value for the particular bin is based on an aggregate of the parameter values for the at least two merged adjacent segments.

8. The method of claim 7, further comprising:
merging the at least two adjacent segments to form the particular bin, based on determining that the parameter values associated with the at least two adjacent segments differ by less than a threshold.

9. The method of claim 1, further comprising:
computing indications representing resolutions of the display screen partitions based on the parameter values associated with the bins.

10. The method of claim 9, wherein computing the indications comprises computing fractions of an overall area of the display screen for respective display screen partitions.

11. The method of claim 10, wherein the parameter values make up a degree of interestingness profile, and wherein computing each of the fractions is based on a ratio of an area of the degree of interestingness profile corresponding to the respective bin, to the overall area of the degree of interestingness profile.

12. The method of claim 1, wherein providing the visualization comprises displaying the display screen partitions as corresponding color-coded matrices.

13. The method of claim 12, wherein displaying the color-coded matrices comprises displaying data values of differing interestingness using different colors.

14. A method executed by program code embodied in a computer-usable storage medium, comprising:
assigning, by the program code executed in a computer, degree of interestingness (DOI) values to respective bins into which a time series of data values has been divided to indicate respective interestingness of the bins;
merging, by the program code executed in the computer, at least two of the bins based on determining that a difference between the DOI values of the at least two bins is less than a threshold, wherein merging the at least two bins results in a reduced number of bins;
computing a DOI value of a merged bin containing content of the at least two bins that have been merged, wherein the DOI value of the merged bin is based on an aggregate of the DOI values of the at least two bins, and wherein the merged bin is part of the reduced number of bins; and
providing, by the program code executed in the computer, a visualization of the data values of the reduced number of bins in respective plural display screen partitions having dimensions based on corresponding DOI values of the respective ones of the reduced number of bins.

15. The method of claim 14, further comprising computing the dimensions of the display screen partitions based on the corresponding DOI values and number of data values in corresponding bins.

16. The method of claim 14, wherein each of the display screen partitions is a matrix of display cells, the method further comprising visualizing more interesting data values in display cells that are larger than display cells for visualizing less interesting data values.

17. The method of claim 14, wherein providing the visualization of the data values in the plural display screen partitions comprises displaying the plural bins of the data values using a multi-resolution display screen.

18. A non-transitory computer-readable storage medium storing instructions that when executed cause a computer to:
divide a collection of data values into plural bins, wherein a number of the bins is dependent upon a change feature of the data values, wherein the change feature is selected from among (1) a change rate of the data values of the collection, and (2) variance in the data values of the collection;
determine parameter values associated with respective bins;
based on the parameter values, provide visualization of the plural bins in corresponding plural display screen partitions of a display screen, wherein at least one of the display screen partitions has a resolution that is different from another of the display screen partitions;
partition the collection of data values into plural segments;
assign parameter values to the plural segments;
form the plural bins based on the plural segments, wherein at least a particular one of the plural bins merges at least two adjacent ones of the segments,
wherein the parameter value for the particular bin is based on an aggregate of the parameter values for the at least two merged adjacent segments.

19. The non-transitory computer-readable storage medium of claim 18, wherein the instructions when executed cause the computer to further:
compute fractions of an overall area of the display screen to be allocated to the display screen partitions, wherein the fractions are computed based on the parameter values associated with the bins.

20. The non-transitory computer-readable storage medium of claim 18, wherein the instructions when executed cause the computer to further:
merge the at least two adjacent segments to form the particular bin, based on determining that the parameter values associated with the at least two adjacent segments differ by less than a threshold.

* * * * *